United States Patent
Kesin et al.

(10) Patent No.: US 9,535,974 B1
(45) Date of Patent: *Jan. 3, 2017

(54) SYSTEMS AND METHODS FOR IDENTIFYING KEY PHRASE CLUSTERS WITHIN DOCUMENTS

(71) Applicant: Palantir Technologies, Inc., Palo Alto, CA (US)

(72) Inventors: Max Kesin, Woodmere, NY (US); Hem Wadhar, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/581,920

(22) Filed: Dec. 23, 2014

Related U.S. Application Data

(63) Continuation-in-part of application No. 14/319,765, filed on Jun. 30, 2014.

(51) Int. Cl.
*G06F 17/30* (2006.01)

(52) U.S. Cl.
CPC ... *G06F 17/30598* (2013.01); *G06F 17/30011* (2013.01)

(58) Field of Classification Search
CPC .................. G06F 17/30705; G06F 17/30598; G06F 17/30011
See application file for complete search history.

(56) References Cited

U.S. PATENT DOCUMENTS

| | | | |
|---|---|---|---|
| 6,374,251 B1 | 4/2002 | Fayyad et al. | |
| 6,567,936 B1 | 5/2003 | Yang et al. | |
| 6,775,675 B1 | 8/2004 | Nwabueze et al. | |
| 6,980,984 B1 * | 12/2005 | Huffman | G06F 17/30657 |

(Continued)

FOREIGN PATENT DOCUMENTS

| | | |
|---|---|---|
| EP | 1191463 | 3/2002 |
| EP | 2555153 | 2/2013 |

(Continued)

OTHER PUBLICATIONS

US 8,712,906, 04/2014, Sprague et al. (withdrawn)

(Continued)

*Primary Examiner* — Tarek Chbouki
(74) *Attorney, Agent, or Firm* — Knobbe, Martens, Olson & Bear LLP

(57) ABSTRACT

Systems and methods are disclosed for key phrase clustering of documents. In accordance with one implementation, a method is provided for key phrase clustering of documents. The method includes obtaining a first plurality of documents based at least on a user input, obtaining a statistical model based at least on the user input, and obtaining, from content of the first plurality of documents, a plurality of segments. The method also includes identifying a plurality of clusters of segments from the plurality of segments, determining statistical significance of the plurality of clusters based at least on the statistical model and the content, and providing for display a representative cluster from the plurality of tokens, the representative cluster being determined based at least on the statistical significance. The method further includes determining a label for the representative cluster based at least on the plurality of clusters and the statistical significance.

12 Claims, 6 Drawing Sheets

(56) References Cited

U.S. PATENT DOCUMENTS

| | | |
|---|---|---|
| 7,373,669 B2 | 5/2008 | Eisen |
| 7,451,397 B2 | 11/2008 | Weber et al. |
| 7,574,409 B2 | 8/2009 | Patinkin |
| 7,596,285 B2 | 9/2009 | Brown et al. |
| 7,783,658 B1 | 8/2010 | Bayliss |
| 7,805,457 B1 | 9/2010 | Viola et al. |
| 7,814,102 B2 | 10/2010 | Miller et al. |
| 7,971,150 B2 | 6/2011 | Raskutti et al. |
| 8,046,362 B2 | 10/2011 | Bayliss |
| 8,135,679 B2 | 3/2012 | Bayliss |
| 8,135,719 B2 | 3/2012 | Bayliss |
| 8,266,168 B2 | 9/2012 | Bayliss |
| 8,301,904 B1 | 10/2012 | Gryaznov |
| 8,312,546 B2 | 11/2012 | Alme |
| 8,321,943 B1 | 11/2012 | Walters et al. |
| 8,347,398 B1 | 1/2013 | Weber |
| 8,447,674 B2 | 5/2013 | Choudhuri et al. |
| 8,484,168 B2 | 7/2013 | Bayliss |
| 8,495,077 B2 | 7/2013 | Bayliss |
| 8,498,969 B2 | 7/2013 | Bayliss |
| 8,554,653 B2 | 10/2013 | Falkenborg et al. |
| 8,560,413 B1 | 10/2013 | Quarterman |
| 8,595,234 B2 | 11/2013 | Siripurapu et al. |
| 8,600,872 B1 | 12/2013 | Yan |
| 8,646,080 B2 | 2/2014 | Williamson et al. |
| 8,682,812 B1 | 3/2014 | Ranjan |
| 8,726,379 B1 | 5/2014 | Stiansen et al. |
| 8,788,405 B1 | 7/2014 | Sprague et al. |
| 8,788,407 B1 | 7/2014 | Singh et al. |
| 8,818,892 B1 | 8/2014 | Sprague et al. |
| 9,009,827 B1 | 4/2015 | Albertson et al. |
| 9,043,894 B1 | 5/2015 | Dennison et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,230,280 B1 | 1/2016 | Maag et al. |
| 9,256,664 B2 | 2/2016 | Chakerian et al. |
| 9,344,447 B2 | 5/2016 | Cohen et al. |
| 2002/0194119 A1 | 12/2002 | Wright et al. |
| 2003/0033228 A1 | 2/2003 | Bosworth-Davies et al. |
| 2003/0074368 A1* | 4/2003 | Schuetze ............ G06F 17/3025 |
| 2003/0097330 A1 | 5/2003 | Hillmer et al. |
| 2003/0154044 A1 | 8/2003 | Lundstedt et al. |
| 2004/0205524 A1 | 10/2004 | Richter et al. |
| 2005/0108063 A1 | 5/2005 | Madill et al. |
| 2005/0222928 A1 | 10/2005 | Steier et al. |
| 2006/0095521 A1 | 5/2006 | Patinkin |
| 2006/0218637 A1 | 9/2006 | Thomas et al. |
| 2007/0106582 A1 | 5/2007 | Baker et al. |
| 2007/0192265 A1 | 8/2007 | Chopin et al. |
| 2007/0294200 A1 | 12/2007 | Au |
| 2008/0133567 A1 | 6/2008 | Ames et al. |
| 2008/0148398 A1 | 6/2008 | Mezack et al. |
| 2008/0288425 A1 | 11/2008 | Posse et al. |
| 2009/0018940 A1 | 1/2009 | Wang et al. |
| 2009/0024505 A1 | 1/2009 | Patel et al. |
| 2009/0044279 A1 | 2/2009 | Crawford et al. |
| 2009/0082997 A1 | 3/2009 | Tokman et al. |
| 2009/0083184 A1 | 3/2009 | Eisen |
| 2009/0172821 A1 | 7/2009 | Daira et al. |
| 2009/0192957 A1 | 7/2009 | Subramanian et al. |
| 2009/0254970 A1 | 10/2009 | Agarwal et al. |
| 2009/0254971 A1 | 10/2009 | Herz |
| 2009/0271359 A1 | 10/2009 | Bayliss |
| 2009/0300589 A1 | 12/2009 | Watters et al. |
| 2009/0318775 A1 | 12/2009 | Michelson et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0106611 A1 | 4/2010 | Paulsen et al. |
| 2010/0125546 A1 | 5/2010 | Barrett et al. |
| 2010/0169237 A1 | 7/2010 | Howard et al. |
| 2010/0185691 A1 | 7/2010 | Irmak et al. |
| 2010/0306029 A1 | 12/2010 | Jolley |
| 2010/0330801 A1 | 12/2010 | Rouh |
| 2011/0029526 A1 | 2/2011 | Knight et al. |
| 2011/0055140 A1 | 3/2011 | Roychowdhury |
| 2011/0087519 A1 | 4/2011 | Fordyce, III et al. |
| 2011/0093327 A1 | 4/2011 | Fordyce et al. |
| 2011/0131122 A1 | 6/2011 | Griffin et al. |
| 2011/0167054 A1 | 7/2011 | Bailey et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0219450 A1 | 9/2011 | McDougal et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0307382 A1 | 12/2011 | Siegel et al. |
| 2011/0314546 A1 | 12/2011 | Aziz et al. |
| 2012/0004904 A1* | 1/2012 | Shin ............... G06F 17/30705 704/9 |
| 2012/0084135 A1 | 4/2012 | Nissan et al. |
| 2012/0084866 A1 | 4/2012 | Stolfo |
| 2012/0117082 A1 | 5/2012 | Koperda et al. |
| 2012/0131107 A1 | 5/2012 | Yost |
| 2012/0158626 A1 | 6/2012 | Zhu et al. |
| 2012/0215898 A1 | 8/2012 | Shah et al. |
| 2012/0254129 A1 | 10/2012 | Wheeler et al. |
| 2012/0266245 A1 | 10/2012 | McDougal et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0330801 A1 | 12/2012 | McDougal et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0151388 A1 | 6/2013 | Falkenborg et al. |
| 2013/0160120 A1 | 6/2013 | Malaviya et al. |
| 2013/0166550 A1 | 6/2013 | Buchmann et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0232045 A1 | 9/2013 | Tai et al. |
| 2013/0276799 A1 | 10/2013 | Davidson |
| 2013/0318594 A1 | 11/2013 | Hoy et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0032506 A1 | 1/2014 | Hoey et al. |
| 2014/0058763 A1 | 2/2014 | Zizzamia et al. |
| 2014/0081652 A1 | 3/2014 | Klindworth |
| 2014/0129261 A1* | 5/2014 | Bothwell ............... G06Q 40/08 705/4 |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0283067 A1 | 9/2014 | Call et al. |
| 2014/0310282 A1 | 10/2014 | Sprague et al. |
| 2014/0316911 A1 | 10/2014 | Gross |
| 2014/0331119 A1 | 11/2014 | Dixon et al. |
| 2014/0379812 A1 | 12/2014 | Bastide, II et al. |
| 2015/0067533 A1 | 3/2015 | Volach |
| 2015/0134666 A1 | 5/2015 | Gettiker et al. |
| 2015/0178825 A1 | 6/2015 | Huerta |
| 2015/0235334 A1 | 8/2015 | Wang et al. |
| 2016/0004764 A1 | 1/2016 | Chakerian et al. |

(56) References Cited

U.S. PATENT DOCUMENTS

2016/0034470 A1 2/2016 Sprague et al.
2016/0048937 A1 2/2016 Mathura et al.

FOREIGN PATENT DOCUMENTS

| EP | 2911078 | 8/2015 |
|---|---|---|
| EP | 2963577 | 1/2016 |
| EP | 2985729 | 2/2016 |
| EP | 3018879 | 5/2016 |
| GB | 2513247 | 10/2014 |
| WO | WO 2008/011728 | 1/2008 |
| WO | WO 2008/113059 | 9/2008 |
| WO | WO 2013/126281 | 8/2013 |

OTHER PUBLICATIONS

US 8,725,631, 05/2014, Sprague et al. (withdrawn)
Gu et al "BotMiner: Clustering Analysis of Network Traffic for Protocol—and Structure-Independent Botnet Detection" Jun. 27, 2008.*
"A Word About Banks and the Laundering of Drug Money," Aug. 18, 2012, http://www.golermxiv.co.uk/2012/08/a-word-about-banks-and-the-laundering-of-drug-money/.
Alfred, Rayner "Summarizing Relational Data Using Semi-Supervised Genetic Algorithm-Based Clustering Techniques", Journal of Computer Science, 2010, vol. 6, No. 7, pp. 775-784.
Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.
Golmohammadi et al., "Data Mining Applications for Fraud Detection in Securities Market," Intelligence and Security Informatics Conference (EISIC), 2012 European, IEEE, Aug. 22, 2012, pp. 107-114.
Gu et al., "BotMiner: Clustering Analysis of Network Traffice for Protocol-and-Structure-Independent Botnet Detection," USENIX Security Symposium, 2008, 17 pages.
Hodge et al., "A Survey of Outlier Detection Methodologies," Artificial Intelligence Review, vol. 22, No. 2, Oct. 1, 2004.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Li et al., "Identifying the Signs of Fraudulent Accounts using Data Mining Techniques," Computers in Human Behavior, vol. 28, No. 3, Jan. 16, 2012.
"Money Laundering Risks and E-Gaming: A European Overview and Assessment," 2009, http://www.cf.ac.uk/socsi/resources/Levi_Final_Money_Laundering_Risks_egaming.pdf.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Nolan et al., "MCARTA: A Malicious Code Automated Run-Time Analysis Framework," Homeland Security (HST) 2012 IEEE Conference on Technologies for, Nov. 13, 2012, pp. 13-17.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http://finsolinic.com/ANTI-MONEY%20LAUNDERING%20TRAINING%20GUIDES.pdf.
Quartert FS "Managing Business Performance and Detecting Outliers in Financial Services," Oct. 16, 2014, retrieved from https://quartetfs.com/images/pdf/white-papers/Quartet_FS_White_Paper—ActivePivot_Sentinel.pdf retrieved on May 3, 2016.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
SYMANTEC Corporation, "E-Security Begins with Sound Security Policies," Announcement Symantec, Jun. 14, 2001.
"Using Whois Based Geolocation and Google Maps API for Support Cybercrime Investigations," http://wseas.us/e-library/conferences/2013/Dubrovnik/TELERCIRC/TELECIRC-32.pdf.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 15/072,174 dated Jul. 13, 2016.
Offical Communication for U.S. Appl. No. 14/473,552 dated Feb. 24, 2015.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175151.8 dated Nov. 25, 2015.
Official Communication for European Patent Application No. 15180515.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for Great Britain Application No. 1404457.2 dated Aug. 14, 2014.
Official Communication for Netherlands Patent Application No. 2012433 dated Mar. 11, 2016.

(56) References Cited

OTHER PUBLICATIONS

Official Communication for U.S. Appl. No. 14/139,628 dated Jan. 5, 2015.
Official Communication for U.S. Appl. No. 14/139,640 dated Dec. 15, 2014.
Official Communication for U.S. Appl. No. 14/139,713 dated Dec. 15, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/486,991 dated Mar. 10, 2015.
Official Communication for U.S. Appl. No. 14/518,757 dated Dec. 1, 2015.
Official Communication for U.S. Appl. No. 14/518,757 dated Dec. 10, 2014.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/698,432 dated Jun. 3, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/857,071 dated Mar. 2, 2016.
Official Communication for U.S. Appl. No. 15/072,174 dated Jun. 1, 2016.
Restriction Requirement for U.S. Appl. No. 14/857,071 dated Dec. 11, 2015.

* cited by examiner ns to be executed by processor 104. Such instruc-

SYSTEMS AND METHODS FOR IDENTIFYING KEY PHRASE CLUSTERS WITHIN DOCUMENTS

CROSS-REFERENCE TO RELATED APPLICATIONS

This application is a continuation-in-part of U.S. patent application Ser. No. 14/319,765, filed on Jun. 30, 2014 and entitled SYSTEMS AND METHODS FOR KEY PHRASE CHARACTERIZATION OF DOCUMENTS, priority from the filing date of which is hereby claimed under 35 U.S.C. §120. The subject matter of application Ser. No. 14/319,765 is expressly incorporated herein by reference.

BACKGROUND

Vast amounts of data are readily available to readers, analysts, and researchers today, on the one hand allowing them to perform more complicated and detailed data analyses than ever, but on the other hand making it more difficult to quickly sort through the data. Automatically characterizing the data in a concise and informative way can help users to identify data that is most relevant for their particular needs. However, characterizing alone may be insufficient to help users quickly sort through the data.

BRIEF DESCRIPTION OF THE DRAWINGS

Reference will now be made to the accompanying drawings, which illustrate exemplary embodiments of the present disclosure. In the drawings.

DETAILED DESCRIPTION

Generally described, aspects of the present disclosure relate to systems and methods that automatically characterize documents by identifying key phrases describing the contents of those documents and by identifying clusters of key phrases. More specifically, the systems and methods can, among other things, obtain a first plurality of documents based at least on a user input; obtain a statistical model based at least on the user input; obtain, from content of the first plurality of documents, a plurality of segments; determine statistical significance of the plurality of segments based at least on the statistical model and the content; determine a representative segment; determine a representative segment for each document; identify a plurality of clusters of representative segments, based at least on the statistical significance and the representative segments; and provide for display a representative cluster from the plurality of clusters, the representative cluster being determined based at least in part on the statistical significance.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
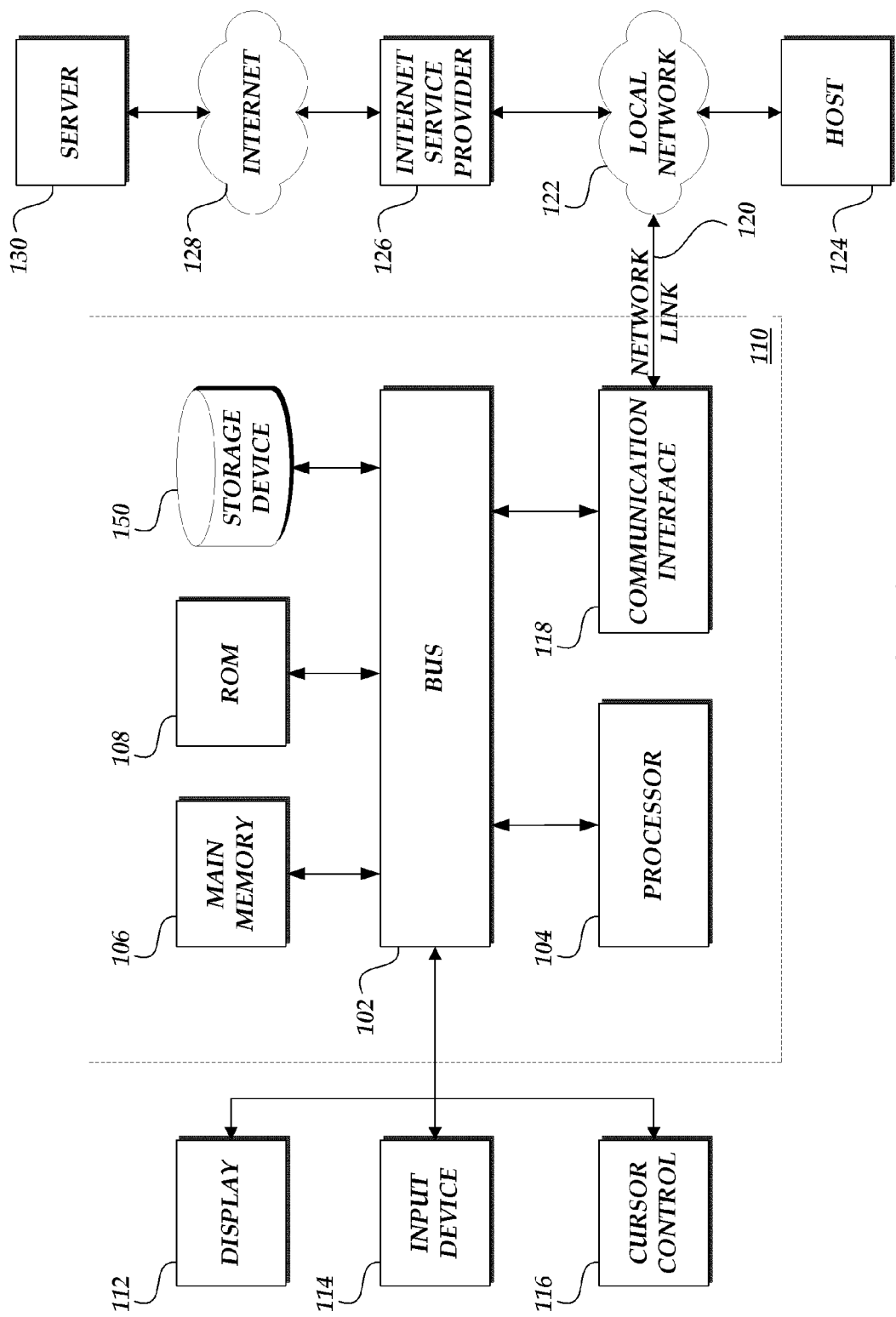
FIG. 1 is a block diagram of an exemplary electronic device, consistent with embodiments of the present disclosure.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Ruby. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio wave and infrared data communications.

Various forms of media can be involved in carrying one or more sequences of one or more instructions to processor 104 for execution. For example, the instructions can initially be carried on a magnetic disk or solid-state drive of a remote computer. The remote computer can load the instructions into its dynamic memory and send the instructions over a telephone line using a modem. A modem local to electronic device 110 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic, or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic, or optical signals that carry digital data streams. The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122, and communication interface 118.

The received code can be executed by processor 104 as it is received and/or stored in storage device 150 or other non-volatile storage for later execution.

Figure 2:
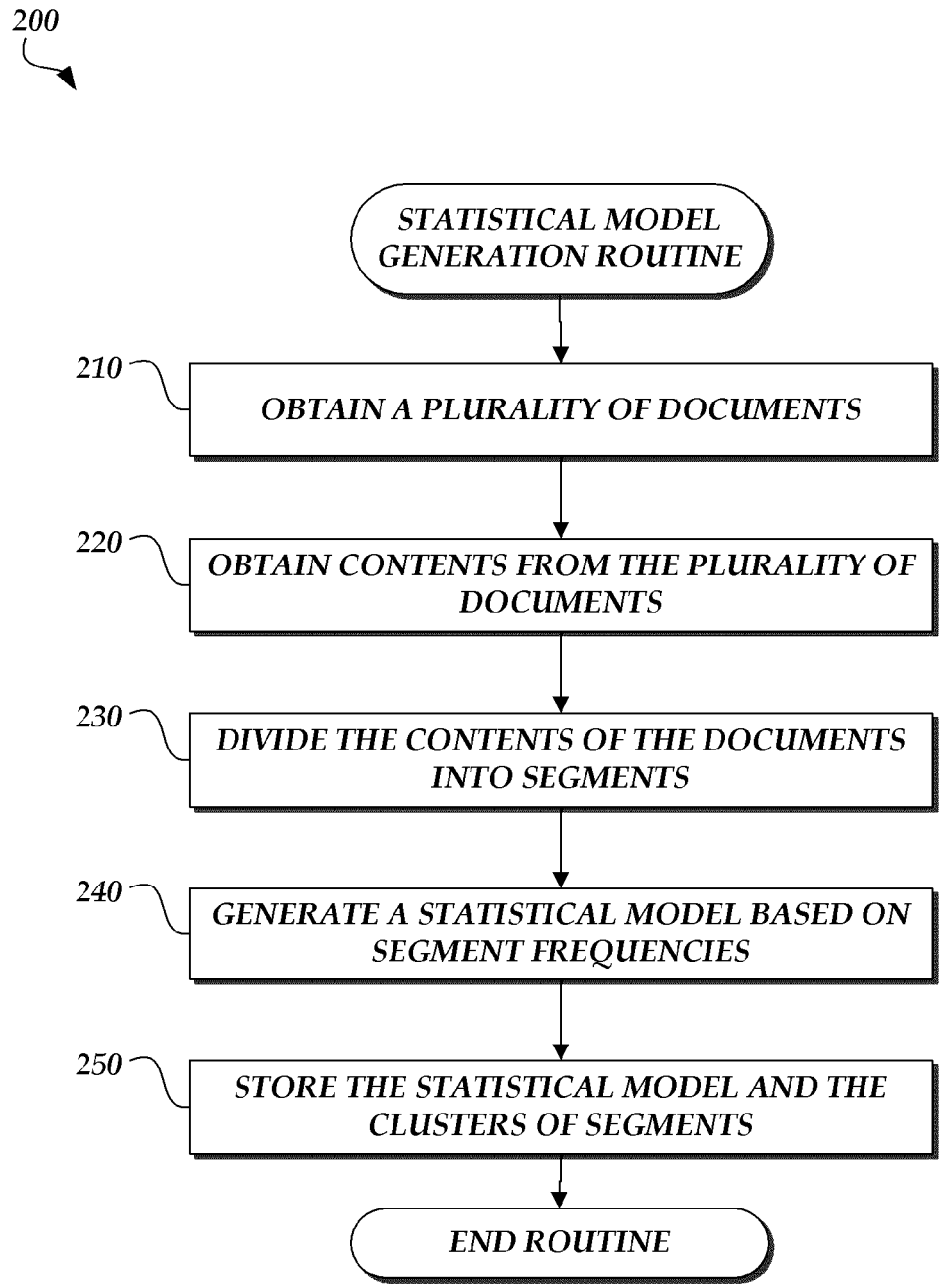
FIG. 2 is a flowchart of an exemplary method for generating a statistical model, consistent with embodiments of the present disclosure.

FIG. 2 shows a flowchart representing an exemplary routine 200 for generating a statistical model representing a plurality of documents. In some embodiments, exemplary routine 200 may be performed by a client application (e.g., a web browser, a plug-in to a web browser, a standalone executable application, etc.) running on a client device, by a server (e.g., a web server), or it can have some blocks executed on the client device and some on the server. Thus, exemplary routine 200 may be performed by one or more electronic devices, such as electronic device 110. And, while exemplary routine 200 and the other embodiments described herein may be performed by multiple electronic devices having one or more processors, for purposes of simplicity and without limitation these embodiments will be explained with respect to a single electronic device (e.g., electronic device 110). While the flowchart discloses the following blocks in a particular order, one skilled in the art will appreciate that at least some of the blocks may, consistent with the teachings of the present disclosure, be moved, modified, or deleted where appropriate.

Referring to FIG. 2 at block 210, the electronic device may obtain a plurality (a corpus) of documents. The electronic device may obtain the documents from one or more databases, which may be stored locally at the electronic device and/or on one or more remote devices. The documents may be of any type of digital format (e.g., HTML, PDF, Microsoft Word, or any other format containing digital text) and may originate from different public or private sources. For example, the documents may originate from Internet web pages, library archives, proprietary subscription-based archives such as IEEE technical articles or Dow Jones's collection of news articles, or any other source of information. The documents may also be obtained by searching the Internet, and may include, for example, some or all search results returned by search engine in response to a user search query. In some embodiments, the documents may be associated with a date, such as the date of publication, the date of the most recent update, and so forth.

In some embodiments, the documents may be associated with entities such as companies or industries. Illustratively, a document may be associated with tags, codes, or other types of metadata describing products, companies, or industries discussed in the documents. For example, a news article discussing a new iPhone® device released by Apple Inc. may be pre-tagged (e.g., automatically or manually by a person) with one or more tags such as "iPhone," "Apple," "AAPL," "consumer electronics," and the like.

With continued reference to FIG. 2 at block 210, the electronic device may, in some embodiments, obtain all documents that are associated with at least one common entity. Illustratively, the electronic device may obtain all documents that are associated with the company Apple Inc. by, for example, obtaining all documents tagged with a tag associated with the company, such as "AAPL," "Apple," "Apple Inc.," etc. The particular common entity may be arbitrarily selected by the user, or can be automatically selected by the electronic device. For example, the electronic device may automatically carry out illustrative routine 200 several times, each time obtaining, at block 210, all documents associated with the next entity from a list of entities.

At block 220, the electronic device may obtain the content of the documents obtained at block 210. In some embodiments, for reasons of performance, the obtained content may include the headlines or titles of the documents, but not the entire text (the body) of the document. In other embodiments, in addition to or instead of the headlines or titles of the documents, the obtained content may include the entire text (the body) of the documents. In yet other embodiments, the obtained content may also contain additional text associated with the documents, such as metadata, user comments, or any other additional text associated with the documents.

At block 230, the electronic device may segment the obtained contents of each document, e.g., by breaking down the contents of each document into segments. Each segment may include, for example, one or more characters, which can include parts of words, single words (e.g., tokens), multiple words (e.g., n-grams), or entire phrases or clauses, such as noun phrases or clauses. For example, if a document's content includes a headline "Apple releases a new iPhone device in October," the electronic device may break this content into single-word segments (or tokens) "Apple," "releases," "a," "new," "iPhone," "device," "in," "October." As another example, the electronic device may break this content into bigram segments, e.g., "Apple releases," "new iPhone," "iPhone device," "in October." As seen in the last example, the electronic device may, in some embodiments, omit some content (e.g., articles, prepositions, etc.), and in some embodiments the same content may be included in more than one token segment (e.g., the word "iPhone" in the above example appears in tokens segments "new iPhone" and "iPhone device").

In some embodiments, before or after breaking the content into segments, the electronic device may also perform various processing of the contents. For example, the electronic device may remove some words from the contents (e.g., articles and prepositions), normalize the contents by reducing each word to its morphological root or lemma, and so forth.

At block 240, the electronic device may generate a statistical model based on the frequencies at which the different segments obtained at block 230 occur within the contents of the documents. For example, the statistical model may contain a number associated with each segment, the number reflecting the number of times the segment was found across all contents of the documents obtained at block 210. In other words, the statistical model may include information reflecting, for various segments, how frequently or rarely that segment is found within the plurality of documents. For example, the model may indicate common English words such as "a," "the," "has," "is," etc., as frequently occurring words. Moreover, if the plurality of documents obtained at block 210 were all associated with a common entity (e.g., "Apple Inc."), the model may indicate the segments related to that entity (e.g., "Apple," "Tim Cook," etc.) as relatively frequent, because these segments are more likely to occur in this plurality of documents than in pluralities of documents that are not necessarily associated with the same common entity.

In some embodiments, the statistical model may store, in addition to the segments and their frequencies, statistical information for sequences of subsequent segments. For example, the statistical model may store frequency information for the segment "new," for the segment "iPhone," and also frequency information of the segment "new" being followed by the segment "iPhone." As discussed above, segments may include more than one word (e.g., bigrams), and therefore in some embodiments the a bigram "new iPhone" may be a single segment for which the statistical model calculates an independent frequency At block 250, the electronic device may store the statistical model in a data storage, for example, in a volatile memory (e.g., in main memory 106), in a non-volatile memory (e.g., in storage device 150), or in both. In some embodiments, the statistical model may be stored in cache memory to allow quick access and updates.

As discussed above, the electronic device may perform exemplary routine 200 many times, each time for a different plurality of documents. Accordingly, the electronic device can generate and store more than one statistical model. In some embodiments, each statistical model can be associated with a different plurality of documents. For example, if a particular plurality of documents is associated with one or more entities (e.g., with Apple Inc., and/or with the consumer electronics industry) the statistical model generated based on that plurality of documents can be stored in association with those entities. Thus, the electronic device can maintain a set of statistical models, and maintain, for example, a look-up table associating one or more entities with one or more statistical models. Each statistical model can be associated with one or more entities, and each entity can be associated with either exactly one statistical model, or, in some embodiments, more than one statistical model. In some embodiments, the electronic device can store, in addition to or instead of statistical models associated with particular entities, a default statistical model that is not necessarily associated with any particular entity and that was generated, for example, based on all documents available to the electronic device.

Figure 3:
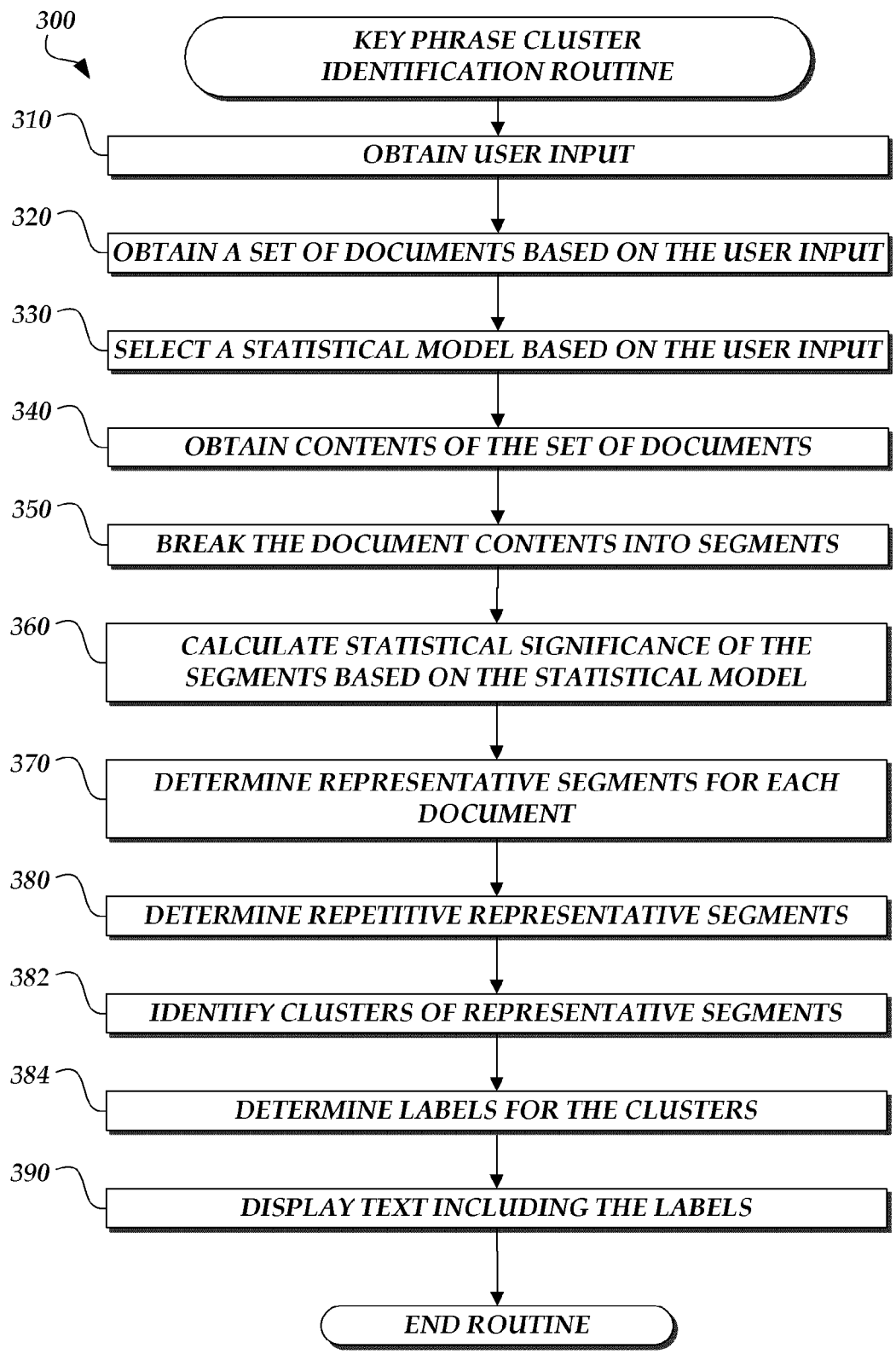
FIG. 3 is a flowchart of an exemplary method for key phrase characterization of documents and identification of key phrase clusters, consistent with embodiments of the present disclosure.

FIG. 3 shows a flowchart representing an exemplary routine 300 for identification of clusters of key phrases within documents. In some embodiments, exemplary routine 300 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, exemplary routine 300 can be performed by one or more electronic devices, such as electronic device 110. And while exemplary routine 300 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following blocks in a particular order, it is appreciated that at least some of the blocks can be moved, modified, or deleted where appropriate, consistent with the teachings of the present disclosure.

At block 310, the electronic device may obtain a user input. The user input may include any input that identifies or defines, either directly or indirectly, a set of documents that are of interest to the user. User input may also include selection or specification, by the user, of an entity (e.g., a product, a company, an industry, etc.), for example, using that entity's name, symbol, stock ticker, etc. In some embodiments, user input may include selection or specification, by the user, of multiple entities. In some embodiments, user input may also specify desired (or undesired) date ranges, geographical regions, document sizes, document sources, or other types of filters indicating the scope of desired documents. In some embodiments, the user input may include a search query from the user, such as "Apple news for January 2015."

Figure 4A:
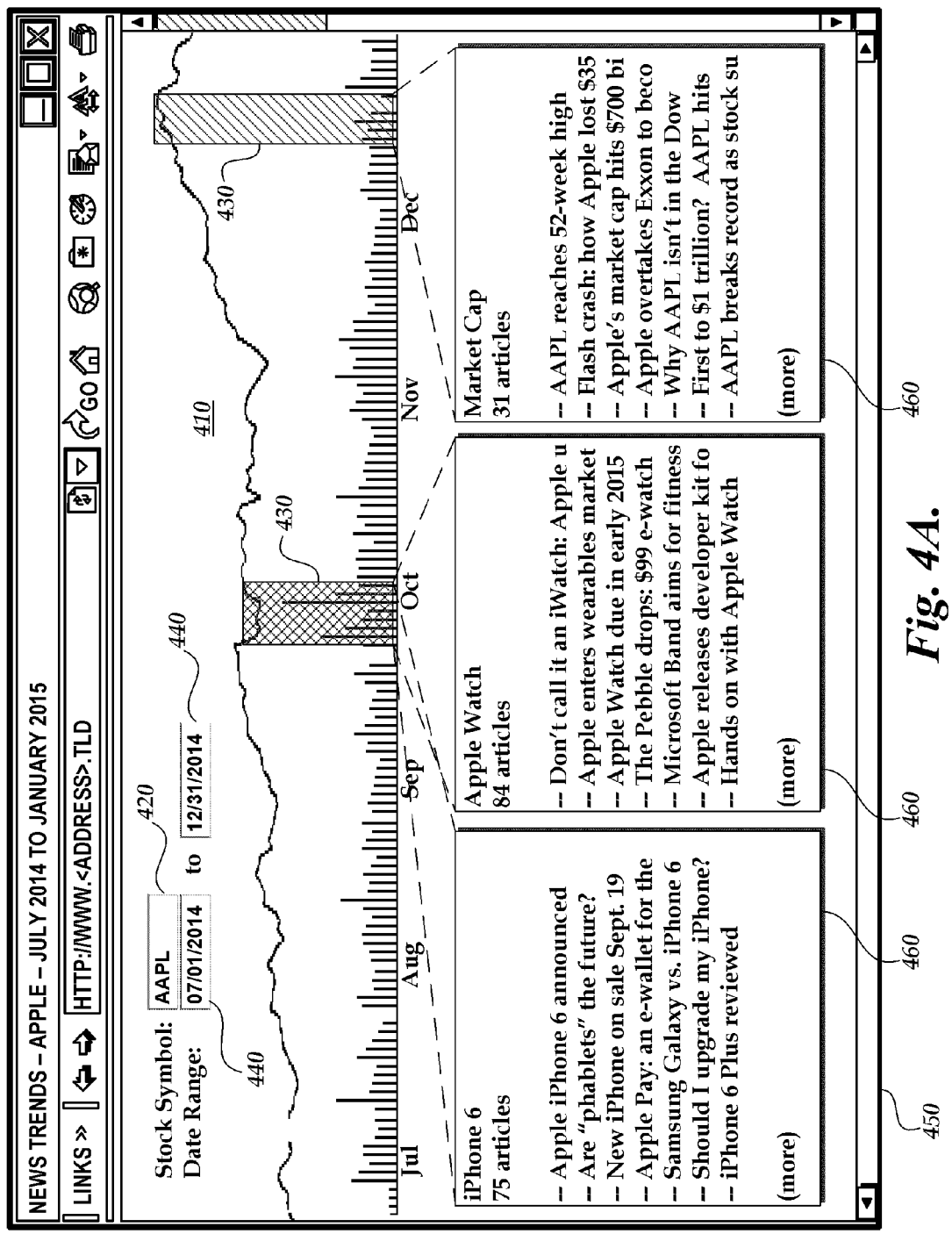
FIGS. 4A-4C illustrate an exemplary display showing exemplary user interactions, consistent with embodiments of the present disclosure.

In some embodiments, as illustrated in FIG. 4A, user input can include selection of a stock symbol 420 and a desired date range 440. In some embodiments, selecting a stock ticker can cause the electronic device to present a stock chart 410 corresponding to the selected stock ticker and showing, for example, changes in stock prices and trading volume. The user can then select the date range directly from the stock chart. For example, the user can identify an unusual spike in stock price or in trading volume and select a date range 430 around that spike.

In some embodiments, the electronic device may initially set the date range to a predetermined date range, and may allow the user to modify it if necessary. For example, the electronic device may preset the date range to include a predetermined number of days, weeks, months, etc., ending with the current date. In some embodiments, the electronic device may preset the date range in accordance with prior date ranges used by the user. In some embodiments, the user may select, instead of whole date ranges, time intervals in resolution of hours, minutes, seconds, etc.

At block 320, the electronic device may obtain a set of one or more documents based on the user input received at block 310. For example, if user input specifies a particular entity (e.g., the company Apple Inc.), the electronic device can obtain, from all the documents available to the electronic device, a set of documents associated with the particular entity, such as a set of documents tagged with a tag "Apple Inc.," "Apple," or "AAPL." If the user input also specifies a date range (e.g., Jul. 1, 2014 to Dec. 31, 2014, as in the example of FIG. 4A), the electronic device may limit the obtained documents only to documents corresponding to (e.g., published on or last updated on) dates that fall within the specified date range. Similarly, the electronic device may limit the scope of the obtained documents based on any other types of filters specified by the user.

In some embodiments, block 310 may be omitted and the electronic device may obtain the set of documents without relying on user input. In some embodiments, when block 310 is omitted, or when it is performed but the user input fails to clearly define the desired scope of documents, the electronic device may obtain a predetermined (e.g., default) set of documents, for example, all documents available to the electronic device.

At block 330, the electronic device may dynamically select a statistical model based on the user input. In some embodiments, the electronic device may select, from a plurality of statistical models, a statistical model that best corresponds to the user input. The plurality of statistical models may be pre-generated, for example, by routine 200, and stored, for example, in a data storage (e.g., cache, volatile, and/or non-volatile memory) accessible by the electronic device.

As discussed above, in some embodiments, each statistical model can correspond to and be stored in association with one or more entities. For example, the electronic device can maintain a look-up table associating one or more entities with one or more statistical models. Accordingly, in some embodiments, if the user input indicates a particular entity, the electronic device can obtain a statistical model that best corresponds to the particular entity, for example, a statistical model that was generated based on a plurality of documents associated with the particular entity. To illustrate, if the user input indicates that the user is interested in documents related to Apple Inc., (e.g., the user inputs a search query "Apple news for January 2015" or selects a stock-price graph corresponding to stock ticker AAPL) the electronic device can automatically obtain a statistical model that was generated based on a plurality of documents tagged with "Apple Inc.," "Apple," or "AAPL." Thus, in some embodiments, the set of documents obtained at block 320 may be a subset of the plurality of documents obtained at block 210 of routine 200, based upon which the statistical model was generated.

In some embodiments, if the electronic device cannot obtain a statistical model that was generated based on a plurality of documents associated with a particular entity specified by the user, the electronic device may obtain, instead, a statistical model that was generated based on a plurality of documents associated with another entity that is related to the particular entity. For example, if the user-specified entity is Apple Inc., and the electronic device cannot obtain a statistical model associated with Apple Inc. (e.g., if it has not been generated or is inaccessible) the electronic device may obtain, instead, a statistical model associated with the consumer electronics industry, because that is an industry associated with Apple Inc. In some embodiments, the electronic device may access a designated database to determine which entities are associated with each other.

Further, if the electronic device cannot obtain a statistical model associated with the user-specified entity, the electronic device may generate such a statistical model (e.g., using routine 200) in real time, after receiving user input at block 310. In some embodiments, the electronic device may generate a new statistical model in real time based on the user input, by using one or more previously generated statistical models. For example, if the documents obtained at block 210 were search results obtained based on a user search query related to more than one distinct concept (e.g., "Apple versus Samsung") the electronic device can generate a new statistical model by merging two previously generated models (e.g., a model associated with Apple, Inc. and a model associated with Samsung Group).

Still further, in some embodiments, if the electronic device cannot obtain a statistical model associated with the user-specified entity, the electronic device can obtain a predetermined (default) statistical model that is not necessarily associated with any particular entity and that was generated, for example, based on all documents available to the electronic device.

While block 330 is listed in the exemplary flowchart of FIG. 3 as being performed before block 340, one skilled in the art will appreciate that block 330 may be performed after block 340, or, generally, at any time before block 360.

At block 340, the electronic device can obtain the contents of the set of documents obtained at block 320. In some embodiments, for reasons of performance, the obtained content may include the headlines or titles of the documents, but not contain the entire text (the body) of the document. In other embodiments, in addition to or instead of the headlines or titles of the documents, the obtained content can include the entire text (the body) of the documents. In yet other embodiments, the obtained content can also contain additional text associated with the documents, such as metadata, user comments, or any other additional text associated with the documents.

At block 350, the electronic device can segment the contents of the set of documents, e.g., break down the contents of each document into segments. Each segment can include one or more characters, which can include parts of words, single words (e.g., tokens), multiple words (e.g., n-grams), or entire phrases or clauses, such as noun phrases or clauses. For example, if document's content includes a headline "Apple releases a new iPhone device in October," the electronic device can break this content into single-word segments "Apple," "releases," "a," "new," "iPhone," "device," "in," "October." As another example, the electronic device can break this content into bigram segments, e.g., "Apple releases," "new iPhone," "iPhone device," "in October." As seen from the last example, the electronic device can, in some embodiments, omit some content (e.g., articles, prepositions, etc.), and in some embodiments the same content can be included in more than one token segment (e.g., the word "iPhone" in the above example appears in segments "new iPhone" and "iPhone device").

In some embodiments, before or after breaking the content into segments, the electronic device can also perform various processing of the contents. For example, the electronic device can remove some words from the contents (e.g., articles and prepositions), normalize the contents by reducing each word in the to its morphological root or lemma, and so forth.

While blocks 340 and 350 of routine 300 for identification of clusters of key phrases within documents may be the same as or similar to blocks 220 and 230 of routine 200 for generating a statistical model, respectively, it is appreciated that blocks 340 and 350 do not have to be same as or similar to blocks 220 and 230, respectively. In some embodiments, however, to achieve better results in terms of quality and/or performance, the electronic device can chose to use the same segmentation and processing methods at block 350 as the segmentation and processing methods carried out at block 220.

At block 360, the electronic device may calculate the statistical significance of the tokens segments obtained at block 350 based on the statistical model obtained at block 330. In some embodiments, the electronic device calculates the statistical significance of a segment by comparing the frequency with which the segment occurred in a particular document (or a set of documents) with the frequency of the segment as indicated in the statistical model. Because the statistical model may be generated based on a large corpus of documents, it can serve as an estimation of a typical or average frequency of a given segment within that corpus. Accordingly, by comparing the frequency of a given segment within a particular document to its frequency in the statistical model, the electronic device may determine whether the segment's frequency in the particular document is higher than average, which may be a good indication that the particular document is specifically directed to the concept or the subject matter described by the segment. For example, a segment "new iPhone" may have a frequency A in the particular document and a frequency B in the statistical model. If frequency A is higher than frequency B (e.g., higher by a predetermined threshold)—i.e., the particular document mentions the term "new iPhone" more often than usual—the electronic device may determine that the segment is statistically significant, meaning that there is high likelihood that the particular document discusses a new iPhone® or some other closely related subject matter.

In some embodiments, the electronic device may calculate a statistical significance value for each segment obtained from the contents of a given document, where the calculation is based at least on the segment's frequency within the contents of the given document and the segment's frequency in the statistical model obtained based on user input in block 330. For example, the statistical significance value can be directly proportional to the segment's frequency within the contents of the given document and inversely proportional to the segment's frequency in the statistical model.

At block 370, the electronic device may determine one or more representative segments for each of the set of documents obtained at block 320. For example, the electronic device may determine, for each document, N segments having the highest statistically significant values among segments of that document's contents, where N is a positive integer. As discussed above, segments having higher statistical significance values are more likely to represent or correspond to the subject matter discussed in the document.

At block 380, the electronic device may determine, among all the representative segments obtained for the set of documents, one or more repetitive representative segments. For example, the electronic device may identify one or more groups of M or more identical or substantially identical representative segments, where M is a predetermined threshold that can be an integer greater or equal to two. For example, if the set of documents obtained at block 320 includes a thousand documents, and M=20, the electronic device may identify any groups of twenty or more documents having identical or substantially identical representative segments. In some embodiments, two segments may be considered substantially identical if the edit distance (e.g., Levenshtein distance) between them is small, e.g., lower than a predetermined threshold, and/or when the segments are synonyms of each other. For example, the electronic device may determine that the segments "health tracker" and "fitness tracker" are substantially identical. Repetitive representative segments can indicate an important subject or event, such as a news event, that is described in multiple documents, such as multiple news sources.

In some embodiments, block 380 can be omitted, and each representative segment can be considered as a repetitive representative segment for the purposes of the following discussion.

At block 382, the electronic device may identify clusters of representative segments within the set of documents obtained at block 320. In some embodiments, the electronic device may identify clusters using the representative segments determined at block 370, and may treat the repetitive representative segments identified at block 380 as substantially identical. For example, the electronic device may identify a cluster of documents having the representative segments "iPhone 6," "new iPhone," and any variation on "bigger screen" (e.g., "larger screens," "bigger display," etc.). The electronic device may identify clusters by, for example, analyzing the frequencies of segments in documents whose representative segment is "iPhone 6" and comparing to the frequencies of segments in documents whose representative segment is "new iPhone." In an alternative embodiment, the electronic device may identify clusters of segments without reference to a document's representative segment. For example, the electronic device may identify as a cluster those documents containing at least three of the segments "Apple Watch," "wearable," "health," and "fitness," regardless of the representative segments for these documents. Further, the electronic device may identify clusters by analyzing the absence of segments. For example, the electronic device may identify a cluster of documents having the segments "Apple," "iPhone," "Touch ID," and "sapphire," but not "GT Advanced," "factory," or "bankruptcy."

Subsequently, at block 384, the electronic device may determine labels for the clusters. For example, the electronic device may determine that the label "Apple Watch" represents a cluster of documents having the representative segments "Apple Watch," "wearable computing," and "health monitor." The electronic device may determine a label by comparing segments, frequencies of segments, representative segments, repetitive segments, or by using the statistical model obtained at block 330. For example, the statistical model may indicate that the segment "iPhone 6 Plus" appears more frequently than any other segment in a cluster of documents with representative segments "phablet," "high definition video," and "iPhone 6 Plus." The electronic device may therefore determine that the label "iPhone 6 Plus" represents the cluster. In some embodiments, the electronic device may determine a label that includes one or more segments. For example, the electronic device may determine that the label "Apple market cap" represents a cluster of documents with representative segments "AAPL," "market cap," and "52-week high."

Figure 4B:
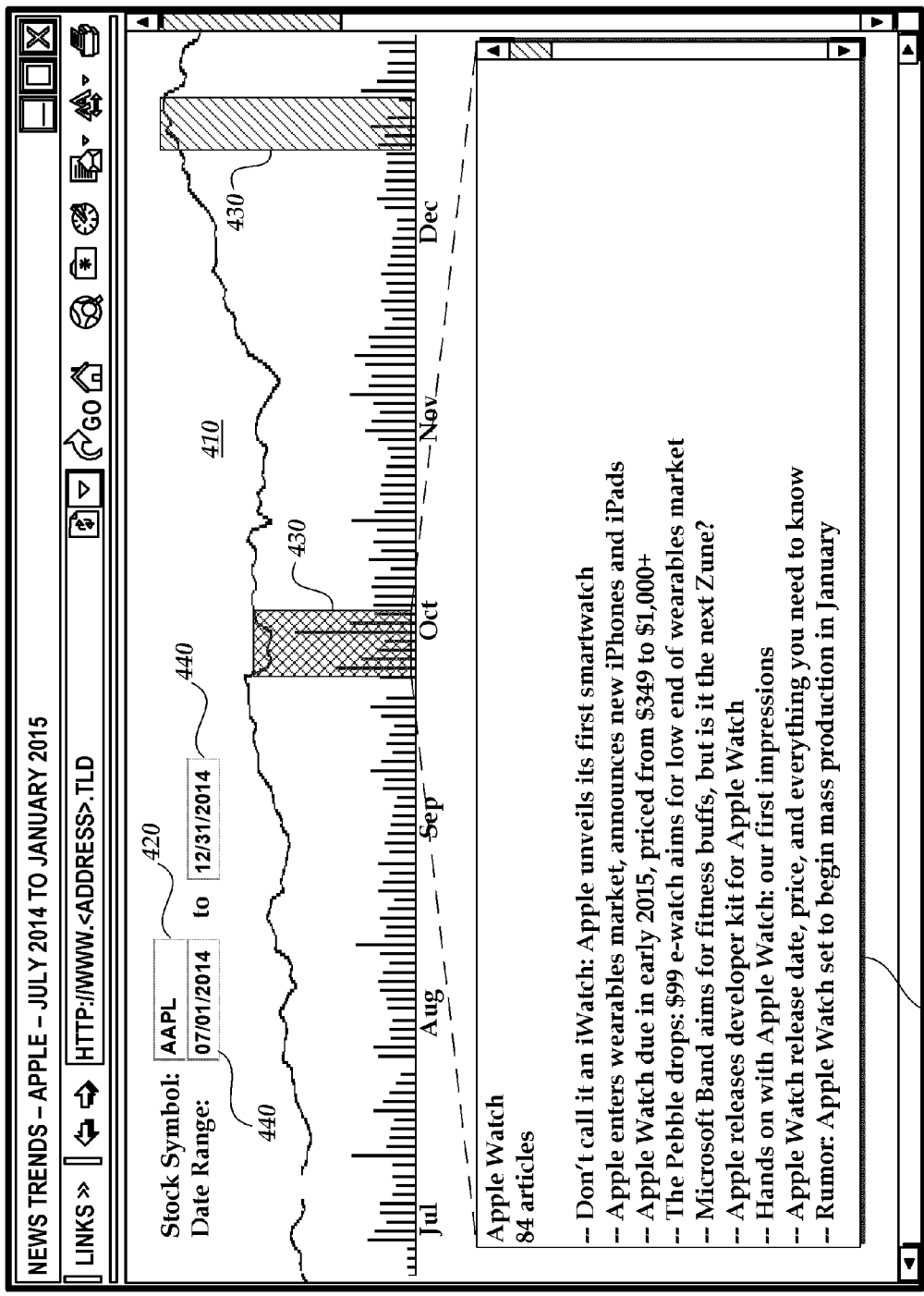

At block 390, the electronic device can display (e.g., on display 112) or provide for display the labels determined at block 384. For instance, in the example illustrated in FIG. 4A, the electronic device determines and displays in window 450 three clusters of documents 460 labeled "iPhone 6," "Apple Watch," and "Market Cap." In some embodiments, as illustrated in FIGS. 4A and 4B, the electronic device can also allow the user to select one of the labels (e.g., "Apple Watch") and, responsive to the user's selection, display (e.g., in an expanded window 460) the contents of and/or links to the documents in the selected cluster.

Figure 4C:
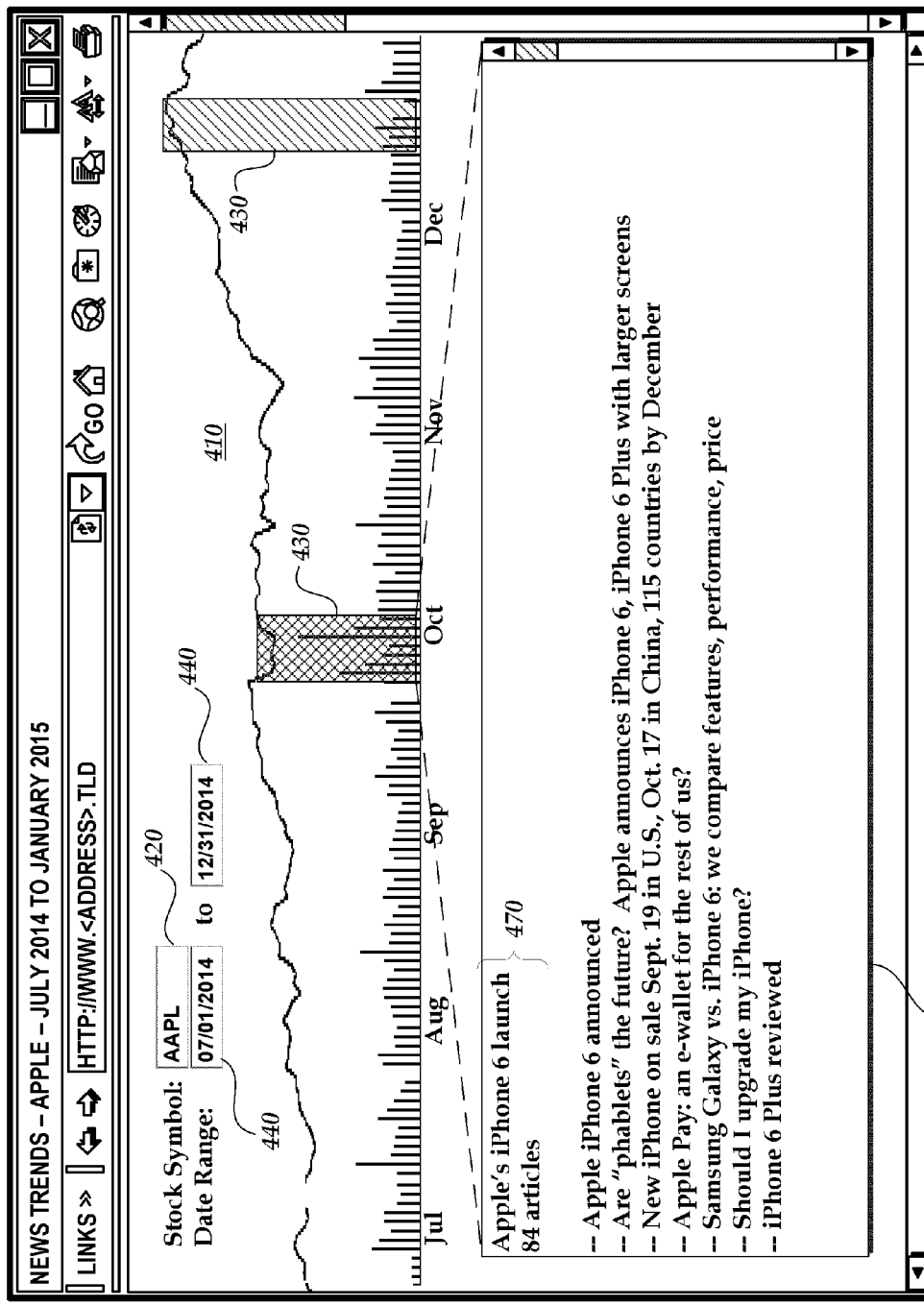

In some embodiments, to provide additional context to the segments and thereby improve readability, the electronic device can display or provide for display at block 390 a key phrase that includes the label. The key phrase can include, for example, a complete sentence, a noun phrase, a verb phrase, or any other meaningful combination of words. The key phrase can be obtained by the electronic device, for example, from the contents of one of the documents having the label. For example, if the label "iPhone 6" appeared in one of the documents (represented by the label) as part of the phrase "AT&T stores getting ready for Apple's iPhone 6 launch," the electronic device can display or provide for display (e.g., in header 470) the key phrase "Apple's iPhone 6 launch," as illustrated in FIG. 4C.

In some embodiments, if the key phrase or phrases corresponding to the label are different in different documents represented by the label, the electronic device can select, among the different key phrases, an "average" key phrase, i.e., the key phrase that is most similar to the other key phrases, as measured based on edit distance, based on the number of common words contained in the phrase, or any other suitable algorithm.

Allowing the user to select a particular date range, for example, around unusual changes in stock price or trading volume, and displaying labels representing the documents (e.g., news articles) within that date range, allows the user to quickly determine which events may have caused the unusual changes.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
a computer display;
one or more computer-readable storage media configured to store instructions; and
one or more processors configured to execute the instructions to cause the electronic device to at least:
obtain a first plurality of documents based at least in part on a user input;
obtain a statistical model based at least in part on the user input;
obtain, from content of the first plurality of documents, a plurality of segments;
determine statistical significance for the obtained plurality of segments based at least in part on the obtained statistical model;
determine, for each document in the first plurality of documents, representative segments from the obtained plurality of segments, the representative segments being determined based at least in part on the determined statistical significance;
cluster documents from the obtained first plurality of documents based at least in part on the determined representative segments;
receive a selection of a date range;
for a cluster of documents associated with a date within the date range, automatically associate a label with the cluster of documents based at least in party on the determined representative segments; and
display within a graphical user interface on the computer display a representation of the date range, the label, and contents of and/or links to documents in the cluster of documents.

2. The electronic device of claim 1, wherein the user input identifies an entity, and the obtained statistical model was generated based on at least one of:
the first plurality of documents;
a second plurality of documents associated with the entity; and
a third plurality of documents associated with an industry associated with the entity.

3. The electronic device of claim 1, wherein determining the label is automatically associated with the cluster of documents based at least in part on a frequency of appearances of the representative segments in the first plurality of documents.

4. The electronic device of claim 1, wherein the one or more processors are further configured to execute instructions to cause the electronic device to:
receive a selection input associated with the cluster of documents; and
responsive to the selection input, provide for display contents of one or more documents within the cluster of documents.

5. A method performed by one or more processors, the method comprising:
obtaining a first plurality of documents based on at least a user input;
obtaining a statistical model based at least on the user input;
obtaining, from content of the first plurality of documents, a plurality of segments;
determining statistical significance for the obtained plurality of segments based at least on the obtained statistical model;
determining representative segments from the obtained plurality of segments for each document in the first plurality of documents, the representative segments being determined based at least in part on the determined statistical significance;
clustering documents from the obtained first plurality of documents based at least in part on the determined representative segments;
receiving a selection of a date range;
for a cluster of documents associated with a date within the date range, automatically associating a label with the cluster of documents based at least in party on the determined representative segments; and
providing for display within a graphical user interface a representation of the date range, the label, and at least one of contents of and links to documents in the cluster of documents.

6. The method of claim 5, wherein the user input identifies an entity, and the obtained statistical model was generated based on at least one of:
the first plurality of documents;
a second plurality of documents associated with the entity; and
a third plurality of documents associated with an industry associated with the entity.

7. The method of claim 5, wherein the automatically associating the label with the cluster of documents is further based on a frequency of appearances of the representative segments in the first plurality of documents.

8. The method of claim 5 further comprising:
receiving a selection input associated with the cluster of documents; and
responsive to the selection input, providing for display contents of one or more documents within the cluster of documents.

9. A non-transitory computer-readable medium storing a set of instructions that are executable by one or more electronic devices, each having one or more processors, to cause the one or more electronic devices to perform a method, the method comprising:
obtaining a first plurality of documents associated with a user input;
obtaining a statistical model associated with the user input;
obtaining, from content of the first plurality of documents, a plurality of segments;
determining statistical significance for the plurality of segments based at least on the statistical model;
determining, for each document in the first plurality of documents, representative segments from the plurality of segments, the representative segments being determined based at least in part on the statistical significance;
clustering documents from the first plurality of documents based at least in part on the representative segments;
receiving a selection of a date range;
for a cluster of documents associated with a date within the date range, automatically associating a label with the cluster of documents based at least in part on the determined representative segments; and providing for display within a graphical user interface a representation of
- the date range,
- the label, and
- contents of documents in the cluster of documents, or links to documents in the cluster of documents, or a combination thereof.

10. The non-transitory computer-readable medium of claim 9, wherein the user input identifies an entity, and the statistical model was generated based on at least one of:
- the first plurality of documents;
- a second plurality of documents associated with the entity; and
- a third plurality of documents associated with an industry associated with the entity.

11. The non-transitory computer-readable medium of claim 9, wherein the automatically associating the label with the cluster of documents is further based on a frequency of appearances of the representative segments in the first plurality of documents.

12. The non-transitory computer-readable medium of claim 9, the method further comprising:
- receiving a selection input associated with the cluster of documents; and
- responsive to the selection input, providing for display contents of one or more documents within the cluster of documents.

\* \* \* \* \*

UNITED STATES PATENT AND TRADEMARK OFFICE
CERTIFICATE OF CORRECTION

PATENT NO. : 9,535,974 B1
APPLICATION NO. : 14/581920
DATED : January 3, 2017
INVENTOR(S) : Maxim Kesin Page 1 of 2

It is certified that error appears in the above-identified patent and that said Letters Patent is hereby corrected as shown below:

On the Title Page

In Column 1 (page 3, item (56)) at Line 20, Under Other Publications, change "golermxiv." to --golemxiv.--.

In Column 1 (page 3, item (56)) at Line 34, Under Other Publications, change "Traffice" to --Traffic--.

In Column 1 (page 3, item (56)) at Line 57, Under Other Publications, change "Frameworok" to --Framework--.

In Column 2 (page 3, item (56)) at Line 3, Under Other Publications, change "finsolinic.com" to --finsolinc.com--.

In Column 2 (page 3, item (56)) at Line 21, Under Other Publications, change "/TELERCIRC/" to --/TELECIRC/--.

In Column 2 (page 3, item (56)) at Line 52, Under Other Publications, change "Offical" to --Official--.

In the Specification

In Column 7 at Line 9, After "the" delete "a".

In Column 7 at Line 11, After "frequency" insert --.--.

In Column 10 at Line 25, Change "reducing each word in the to its morphological root" to --reducing each word to its morphological root--.

Signed and Sealed this
Eleventh Day of April, 2017

Michelle K. Lee
*Director of the United States Patent and Trademark Office*

CERTIFICATE OF CORRECTION (continued)
U.S. Pat. No. 9,535,974 B1

In the Claims

In Column 13 at Line 39, In Claim 1, change "party" to --part--.

In Column 13 at Line 53, In Claim 3, after "wherein" delete "determining".

In Column 14 at Line 21, In Claim 5, change "party" to --part--.